United States Patent
Garcia Navarro et al.

(10) Patent No.: US 10,638,183 B2
(45) Date of Patent: Apr. 28, 2020

(54) CUSTOMIZED CHANNEL

(71) Applicant: DISH Technologies L.L.C., Englewood, CO (US)

(72) Inventors: Carlos Garcia Navarro, Boulder, CO (US); Eric Holley, Atlanta, GA (US)

(73) Assignee: DISH Technologies L.L.C., Englewood, CO (US)

( * ) Notice: Subject to any disclaimer, the term of this patent is extended or adjusted under 35 U.S.C. 154(b) by 32 days.

(21) Appl. No.: 15/685,275

(22) Filed: Aug. 24, 2017

(65) Prior Publication Data

US 2018/0041791 A1 Feb. 8, 2018

Related U.S. Application Data

(63) Continuation of application No. 14/298,455, filed on Jun. 6, 2014, now Pat. No. 9,788,036.

(51) Int. Cl.
| | |
|---|---|
| *H04N 21/2668* | (2011.01) |
| *H04N 21/2665* | (2011.01) |
| *H04N 21/462* | (2011.01) |
| *H04N 21/458* | (2011.01) |
| *H04N 21/258* | (2011.01) |
| *H04N 21/45* | (2011.01) |
| *H04N 21/442* | (2011.01) |

(52) U.S. Cl.
CPC ... *H04N 21/2668* (2013.01); *H04N 21/25891* (2013.01); *H04N 21/2665* (2013.01); *H04N 21/44222* (2013.01); *H04N 21/458* (2013.01); *H04N 21/4532* (2013.01); *H04N 21/4622* (2013.01)

(58) Field of Classification Search
CPC ........ H04N 21/2668; H04N 21/25891; H04N 21/26241; H04N 21/26283; H04N 21/2665; H04N 21/458; H04N 21/4622
See application file for complete search history.

(56) References Cited

U.S. PATENT DOCUMENTS

| | | |
|---|---|---|
| 9,788,036 B2 | 10/2017 | Navarro et al. |
| 2001/0056577 A1 | 12/2001 | Gordon et al. |
| 2004/0205816 A1* | 10/2004 | Barrett ............... H04N 5/76 725/49 |
| 2006/0174269 A1 | 8/2006 | Hansen-Turton |
| 2008/0022309 A1* | 1/2008 | Begeja .............. H04N 7/165 725/46 |

(Continued)

OTHER PUBLICATIONS

U.S. Appl. No. 14/928,455, filed Jun. 6, 2014, Notice of Allowance dated May 24, 2017, all pages.

(Continued)

*Primary Examiner* — Benjamin R Bruckart
*Assistant Examiner* — Susan X Li
(74) *Attorney, Agent, or Firm* — Kilpatrick Townsend & Stockton LLP

(57) ABSTRACT

Various arrangements generating a customized channel are presented. A customized channel may be generated for a user. The programming for the customized channel may be gathered from different sources. The programming may be selected and scheduled based on user preferences, interests, and viewing habits of the user. The user viewing habits and preferences for programming may be used to refine the schedule and programming of the customized channel.

18 Claims, 10 Drawing Sheets

(56) References Cited

U.S. PATENT DOCUMENTS

| | | |
|---|---|---|
| 2009/0183217 A1 | 7/2009 | Mukerji et al. |
| 2009/0320072 A1 | 12/2009 | Mcclanahan et al. |
| 2010/0251304 A1 | 9/2010 | Donoghue et al. |
| 2010/0257561 A1* | 10/2010 | Maissel .............. H04N 5/44543 725/41 |
| 2011/0214154 A1* | 9/2011 | Nagano .............. H04N 21/4532 725/87 |
| 2014/0359668 A1* | 12/2014 | Nagahama ....... H04N 21/26283 725/40 |
| 2015/0113548 A1* | 4/2015 | Stern ................. H04N 21/4826 725/9 |
| 2015/0121408 A1* | 4/2015 | Jacoby .............. H04N 21/6582 725/18 |

OTHER PUBLICATIONS

U.S. Appl. No. 14/928,455, filed Jun. 6, 2014, Non-Final Rejection dated Oct. 21, 2016, all pages.
U.S. Appl. No. 14/928,455, filed Jun. 6, 2014, Final Rejection dated Feb. 18, 2016, all pages.
U.S. Appl. No. 14/928,455, filed Jun. 6, 2014, Non-Final Rejection dated Jul. 29, 2015, all pages.

* cited by examiner

CUSTOMIZED CHANNEL

CROSS-REFERENCE TO RELATED APPLICATIONS

The present application is a continuation of U.S. patent application Ser. No. 14/298,455, filed Jun. 6, 2014, entitled "CUSTOMIZED CHANNEL", the contents of which are incorporated herein by reference, in their entirety.

BACKGROUND

Television entertainment systems may have access to a large number of content including broadcast stations, on demand programming, internet television, and recorded programming. Users may have to search and navigate hundreds of broadcast channels and other sources to find programming that matches their interests or mood. Users are often forced to navigate from channel to channel or from source to source to select the desired content. Due to the large number of options many users may spend more time trying to locate or decide what programming or content to watch than watching the content. What is needed is a better way of presenting content to users that is pertinent to the user's interests and viewing habits.

SUMMARY

A customized channel may be generated for a user. Programming for the customized channel may be gathered from different sources. The programming may be selected and scheduled based on user preferences, interests, and viewing habits of the user. The user viewing habits and preferences for programming may be used to refine the schedule and programming of the customized channel.

In some embodiments, a television receiver configured to output a customized channel is presented. The television receiver may include a tuner configured to receive programming content. The television receiver may include a channel engine configured to schedule programming content for the customized channel. The television receiver may include one or more processors and a non-transitory computer-readable storage medium communicatively coupled with and readable by the one or more processors and having stored therein processor-readable instructions. When the instructions are executed by the one or more processors they may cause the one or more processors to determine a programming preference of a user. The instructions may further cause the one or more processors to identify a set of programming content from one or more programming sources based at least in part on the preference of the user and schedule, using the channel engine, the set of programming content for viewing on the customized channel. The instructions may further cause the one or more processors to schedule, using the channel engine, additional programming content for a first time slot of the customized channel. After scheduling of additional programming, the first time slot of the customized channel may include at least two scheduled programming. The instructions may also cause the one or more processors to receive, from the user, an indication to select one programming content from the two scheduled programs for viewing during the first time slot of the customized channel and update the programming preference based on the indication. In embodiments the customized channel may be a channel not previously available and may be only available to the user. In embodiments the two scheduled programs may include programming content of at least two different types. In some cases the first time slot may be at a time of day when the preference of the user indicates an uncertainty in the type of programming content. In other cases the first time slot may be randomly selected. In some embodiments programming sources may include on-demand video. The programming content and the additional programming content may be scheduled to maximize a user enjoyment score. The user enjoyment score may be computed based on a score assigned to each scheduled programming content and time slot of the customized channel.

In some embodiments a method for scheduling programming content is presented. The method may include determining a programming preference of a user and identifying a set of programming content from one or more programming sources according to the programming preference of the user. The method may further include scheduling the set of programming content for viewing on a customized channel and scheduling additional programming content for a first time slot of the customized channel, wherein after scheduling of additional programming, the first time slot of the customized channel may include at least two scheduled programming. The method may also include receiving, from the user, an indication to select one programming content from the two scheduled programs for viewing during the first time slot of the customized channel and updating the programming preference based on the indication.

In some embodiments a non-transitory processor-readable medium for scheduling programming content is presented. The non-transitory processor-readable medium may include processor-readable instructions configured to cause one or more processors to determine a programming preference of a user and identify a set of programming content from one or more programming sources according to the programming preference of the user. The instructions may also be configured to cause one or more processors to schedule the set of programming content for viewing on a customized channel and schedule additional programming content for a first time slot of the customized channel, wherein after scheduling of additional programming, the first time slot of the customized channel includes at least two scheduled programming. The non-transitory processor-readable medium may include processor-readable instructions configured to cause one or more processors to also receive, from the user, an indication to select one programming content from two scheduled programming for viewing during the first time slot of the customized channel and update the programming preference based on the indication.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
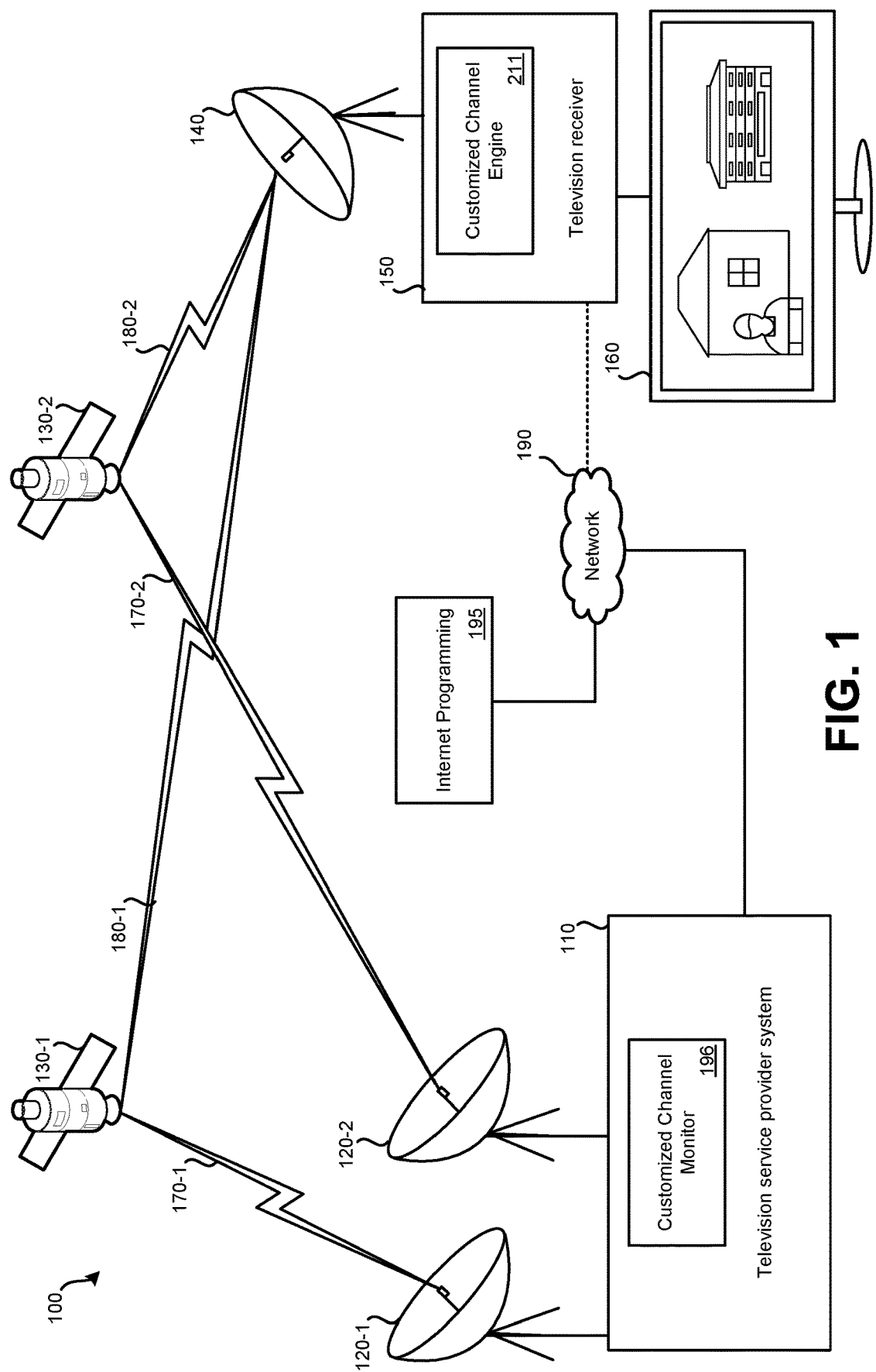
FIG. 1 illustrates an embodiment of a satellite television distribution system.

Television entertainment systems, such as satellite based systems, may have access to a large number of content. Content may include broadcast stations, on demand programming, recorded programming, streaming programming, content from the internet, webcasts, and/or the like. Programming and/or content that a specific user is interested in watching may be distributed among many different stations, channels, and/or sources. Locating or remembering what programming is available, at what time, and from which source may be a time consuming and/or impossible task for many users.

For example, a user with an interest in home improvement may prefer to watch a gardening show that is broadcast at 6 PM at a first channel and may prefer to watch a home renovation show that is broadcast at 7 PM at a second channel. Typically, a user interested in watching the two shows may be required to manually tune to the two channels. In order to enjoy the two shows the user may be required to remember at what channels these programs are available, at what time slots, remember to change the channel, and the like. The user's task may become more complicated when the air time or the channel of the preferred programming changes. The user may have to search for the programming or try to locate new programming of interest. The problem of locating, scheduling, and keeping track of preferred programming by a user has become increasingly frustrating as more and more programming options, sources, genres, and the like are added or changed each year. Non-traditional programming content sources such as videos, audio, or podcasts available on-demand from the internet may also be viewed through a set-top-box (STB). Internet sourced programming may include millions of individual content sources of videos, or audio files. To locate internet based content through their STBs user may be forced to perform complex searches and manually create playlists for the content. Users may often spend more time locating than watching and enjoying the programming.

In embodiments, programming may be presented to the user such that the user may not be required to locate and/or navigate to view programming that is pertinent to the user's interests. In embodiments, one or more customized channels may be generated for a user. Programming and content that is pertinent to a user, genre, or interests may be aggregated and presented to the user in one or more customized channels. Programming and content may be assembled or stitched together from programming from one or more sources such as broadcast stations, webcasts, internet sources, and/or the like. Programming and content may be assembled and presented to the user such that all the programming is available at one customized channel. Programming and content may be assembled into one channel such that the user may not need to change channels, perform internet searches, remember which programming is normally available at which channel and at what time.

For example, a customized channel may be generated for the user with an interest in home improvement programming. A customized channel may be created that allows a user to view pertinent programming from various sources such as broadcast channels and/or internet sources. The user may identify preferred programming. The preferred programming such as the gardening show from the first channel and the home renovation show from the second channel may be available for viewing to the user via the customized channel. The customized channel may allow the user to view their preferred programming without the user having to change channels or search for available programming. For example, the home gardening show and the home renovation show may be viewed by the user, sequentially, during the time slots the two shows normally air via the customized channel without having to change the channel. Videos related to home improvement may be identified and scheduled for viewing via the customized channel without requiring the user to search for videos and initiate playback of the videos. The videos and/or other content relevant to home improvement may be available for viewing via a customized channel whenever the user tunes to the channel without requiring the user to initiate playback.

In embodiments, the customized channel may appear as one of the channels or programming sources available to the user via the STB. The customized channel may have programming data in the electronic programming guide. The programming data may correspond to the programming scheduled to be available via the customized channel. From the user's point of view, the customized channel may appear like another television channel on the STB, but in reality that television channel may have been generated using content from multiple sources and the content may be based on information gathered about that user's preferences and/or viewing habits. The receiver may include an indicator (e.g. an icon or a logo) in the EPG to flag those channels that have been customized for the user.

Generating a customized channel for a user may include aspects of determining and identifying available programming of interest to the user and scheduling an arrangement of the identified programming on the customized channel.

In some embodiments the user may specify preferred programming or content. The user may identify specific shows, genres, actors, and/or types of programming. Based on the programming identified by the user a customized channel may be populated with programming from different sources. In embodiments, the customized channel may assemble and stitch together programming from one or more different sources available to the user.

Programming identified by the user may not be enough to completely fill the time slots available on the customized channel. In some embodiments, additional programming for the customized channel may be automatically determined based on the identified programming, viewing habits, user preference settings, and/or the like.

For example, a user may identify two preferred shows related to gardening and home renovation. Based on the identified shows, additional programming may be determined that may match the interests of the user. Other shows or programming that may be available through the set-top-box may be searched to determine similar programming.

The identified programming may be added to the customized channel. The customized channel may gather programming from one or more different sources allowing the user to access programming related to home improvement via one customized channel.

In embodiments a customized channel may be configured to only include programming from broadcast channels. Some customized channels may be configured to only include programming from internet sources. Internet sources may be limited to specific websites, content providers, and/or the like. Some customized channels may be configured to only include programming that has been recorded on the user's STB. Other customized channels may be configured to include programming from multiple sources and may include content from one or more of broadcast stations, recorded programming, and/or programming available through the internet.

Programming identified for the customized channel may be scheduled for specific time slots of the customized channel. Scheduling of programming content may be restricted by programming content constraints, user preferences, time constraints, equipment limitations, and/or the like.

For example, in some embodiments, the programming on the customized channel may be restricted to be available for viewing on the customized channel only at a time slot corresponding to the original air time of the programming. For example, if the preferred gardening show is only normally viewable at 6 PM, the customized channel may be constrained to schedule the show for the 6 PM time slot.

In some embodiments, the programming available at the customized channel may be available for viewing at a different time than originally aired. The customized channel make take advantage of the recording functionality of a set-top-box to record and play back programming at different time slots than originally aired. Recorded functionality may be used to buffer programming or generate a custom viewing schedule for the user.

In embodiments, programming for the customized channel may be available for viewing by the user at a different time than originally aired. Programming may be recorded and may be available for viewing on the customized channel at a different time slot than originally aired. The programming may be buffered or moved to accommodate scheduling of preferred programming. For example, in some cases preferred television shows may normally air simultaneously during the same time slot on two different channels. In order for the two programming streams to be viewable on the customized channel, one of the shows may be recorded while the other show is available for viewing. The recorded show may be available for viewing on the customized channel at a later time.

Some programming content available for the customized channel may be available on demand and may be scheduled for any time slot of the customized channel. Some video programming from the internet, or programming recorded on the STB may have no schedule constraints.

In embodiments, a scheduler may be used to determine an appropriate recording and viewing schedule for the customized channel. The recording and viewing scheduler may take into consideration the set-top-box resources, user's preferences, copyright constraints, programming schedules, and/or the like to determine which programming should be included in the customized channel at what time slot.

In some embodiments the scheduler may be configured to optimize the programming schedule for specific parameters. The scheduler may be configured to optimize the programming schedule to maximize the user's viewing experience. For example, programming may be assigned a score based on the preferences of the user, i.e. programming that matches the preferences and/or interest of the user may be assigned a higher score than programming that does not match the user's interests. Time slots of the customized channel may also be assigned scores based on the viewing habits of the user, i.e. time slots for which the user is more likely to watch the channel may be assigned a higher score than those that are seldom watched by the user. A schedule score may be computed by taking the sum of the product of the time slot score and the score of the programming assigned to the time slot for all the time slots. The scheduler may be configured to arrange the programming on the customized channel such that the schedule score is maximized. In some cases the scheduler may be configured to maximize the schedule score within the recording constraints of the set-top-box. The set-top-box may have limited recording capability such that only a limited number of shows may be recorded and available on the customized channel at a time slot different than the original airing time slot of the show.

In some embodiments the scheduler may be constrained with specific shows in specific time slots. User preferences may include specific constraints on some programming that the user desires to view on the customized channel in specific time slots. In some embodiments, maximization or optimization may not be possible and "best effort" or sub-optimal algorithms and schedulers may be sufficient.

In embodiments, multiple customized channels may be generated. A different customized channel may be generated for each user, or user profile on a set-top box. In some embodiments more than one customized channel may be generated for each user. A customized channel may be created for different genres of programming. A user may create one customized channel for sports, where only the user's preferred sports are shown, for example. Another customized channel by the same user may include a channel limited to showing only programming related to home improvement. In some embodiments, some or all of the customized channels may be configured to always show the same type, class, or genre of programming regardless of the time and/or time of the week. A customized channel devoted to home improvement may, for example, only include programming related to home improvement regardless of when the user tunes into the channel.

In some embodiments, one or more of the customized channel may be configured with a different type, class, and/or genre of programming for different times of the day, days of the week, seasons, and/or the like. The type of programming may be adapted to the viewing habits or preferences of the user. A user may, for example, view news shows in the morning on weekdays and drama shows in the evenings. The same user may prefer to view cartoons on weekend mornings, for example. A single customized channel may be created for the user with the appropriate programming scheduled at specific times of day and/or days of the week according to the user's preference and viewing habits. Regardless of the time of the day or day of the week, a user may tune to a single customized channel to view the appropriate programming that matches the user's interests and/or preferences eliminating the necessity of searching for programming or change channels.

In some embodiments, once a programming schedule is established for a customized channel the user may not be able to alter or modify the schedule of the programming. The user may be prohibited from skipping programming, fast forwarding, or other operations that may normally be prohibited for a typical broadcast channel. Changes to the schedule or preferences may be effective after a fixed time such as a couple of hours, or a day or more, after the preferences are made.

In some embodiments, a user may be permitted to fast forward or skip some programming during some time slots of the customized channel. During some time slots of the customized channel, some programming may be pre-recorded or streaming allowing fast forwarding, pausing, or skipping some of the programming content. In some cases a scheduled content may be dynamically replaced based on the feedback or choice of the user. In some embodiments a customized channel may be configured to dynamically replace scheduled programming content with alternative content based on user input. In some embodiments the user may provide feedback regarding the scheduled programming. Negative feedback may prompt the STB to locate another available programming content option for the time slot. Upon receipt of negative feedback for programming in a time slot of the customized channel the STB may automatically identify alternative programming content for the time slot and automatically replace the scheduled programming content with the alternative content that matches the user's preference and/or viewing habits.

In embodiments, additional information may be available for the programming of the customized channel. Information may include data regarding actors, synopsis, genre, content source, and the like. The user may be able to navigate and select additional content related to the programing and perform actions on the programming offered in the customized channel, such as to record the content, fast forward, rewind, play, pause and resume playing.

In some embodiments, the customized channel may be configured to allow the scheduling of two or more alternative programming content choices for one or more of the time slots. For some time slots two or more alternative programming choices may be presented to the user allowing the user to select one of the alternative programming choices the user would prefer to view. During the start of the time slot, for example, a notification to the user may be presented allowing the user to select one of the alternative programming choices. In some cases the user may request a scheduling change by using the remote or menu options.

Alternative programming choices in the customized channel may be selectively positioned at specific time slots or times of the day to determine a user's mood, preferred content, or determine the user's viewing preferences. For example, for a customized channel configured to show different type of content at different times of the day, during some of the time slots alternative programming choices may be presented to the user to determine when to transition from one type of programming to another. For example, a customized channel may be, based on user preferences, configured to schedule news shows in the morning and talk shows in the afternoon. However, the exact time when the transition from one type of programming (e.g. new shows) to another (e.g. talk shows) may change each day, may be based on the mood of the user, and the like. To determine the user's mood the user may be presented with a choice of programming for some time slots in the late morning or early afternoon. The choice of alternative programming may be a choice between a news show and a talk show, for example. Based on the user's choice, the determination may be made as to the mood of the user and user's preference for time of transition between types of programming.

In the case of some spontaneous events, such as breaking news, these events may be automatically inserted in the customized channel. The receiver may prompt the user and let the user decide if the user prefers to watch this event or the one that was originally scheduled. In some embodiments the user may specify settings for spontaneous events. The user may specify preferences for the types of events that may be allowed to interrupt the scheduled programming. The user may specify preferences if the spontaneous events are automatically inserted in to the programming or if a notification such as a banner of the event is first presented to the user. The user may for example limit spontaneous events to weather events, political events, specific channels, and/or the like.

Programming choices may be periodically or randomly inserted to the customized channel schedule to determine user preferences for new programming choices, learn and adapt to the user's changing preferences, present to the user new programming the user may not be aware of, and/or the like. Based on user selection of alternative programming choices, the preferences of the user may be continuously or periodically refined and may be used to refine scheduler parameters.

In addition to or alternatively to tracking user's choice in alternative programming, user feedback may be received based on user's ratings of the programming, viewing habits, and the like. User's engagement with scheduled programming may be monitored and used to determine user preferences and adjust the programming schedule. In some embodiments, the user may be presented with a questionnaire. The questionnaire may be designed to directly determine preferred programming. In some cases, the questionnaire may be designed to deduce viewing habits and preferred programming with indirect questions or methods. The questionnaire may for example be a game related to the programming. For example, the game may be trivia game with questions related to programming or topics of interest to the user. The questions may be designed to gauge the user's engagement with the watched programming. If a user is able to correctly answer questions related to watched programming it may be deduced that that user has a strong interest in the programming or programming type. The user may be incentivized to participate in the games with rewards. The user may be rewarded with merchandise, money, or other credits based on how many answers the user answers correctly. Other interactive games and interactive questionnaires may be designed to determine the user's interests and preferred programming for the customized channel.

In some embodiments the STB may keep track of which programming of the customized channel has been watched by the user. Programming that was not watched may be rescheduled for a different time slot or on a different date if available. In some embodiments, the receiver may keep track of the programming offered on the customized channel. Programming watched by the user may be assigned a score. The STB may track the score of watched programming and may use this data to prioritize future customized schedules. The receiver may take into consideration content type, genre, actors, time spent watching the event, and other factors to assign the score. User's activity with respect to fast forwarding, skipping, or rewinding portions of the programming may be further used to determine the user's engagement and score. A separate score may be maintained by the STB for the genre, actors, directors, country or origin or the watched programming. Programming related to the highest scoring actors, directors, genres, and the like may be given scheduling priority for the user.

In some embodiments some programming content may be available to the STB without advertisements or commercials. In embodiments, commercials and advertisements may be injected into the programming content. The commercials may be tailored to the user. Commercials may be determined and scheduled based in part on the user preferences in programming, viewing habits, current programming being watched, and/or the like.

In embodiments, a customized channel may be generated and maintained by the STB. Each STB may determine a user's preferences and generate a schedule for a customized channel tailored for the user's preferences and/or viewing habits. The STB may access programming guide data, meta-data, access external programming data to identify programming content pertinent to the user's interests.

In some embodiments the customized channel may be generated by the service provider. The service provider may generate and transmit to the STB a customized channel programming schedule that the STB assembles into different programming from different sources. A service provider may have a library of different standard customized channel schedule definitions that may be accessed by an STB and selected by a user. The library of customized channel definitions may include definitions for different genres, regions, and the like. Once selected and activated by a user, the predefined customized channel may be modified by the user or modified according to user's viewing habits.

In some cases, the customized channel may be generated for a larger audience and not specifically for an individual user. Customized channels may be generated for specific geographic regions, interests, age groups, and the like. In some cases the customized channel may be determined by the preferences of a number of people through social media, viewing activity, surveys, voting, and the like.

Customized channels may be implemented in a satellite based television system, an embodiment of which is illustrated in FIG. 1. The system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. In embodiments a stream of a television channel may be referred to as a programming stream. In some cases several television channels may be combined into one stream such as in a transponder stream. In this descriptions transponder streams and programming streams may be used synonymously.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite.

Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
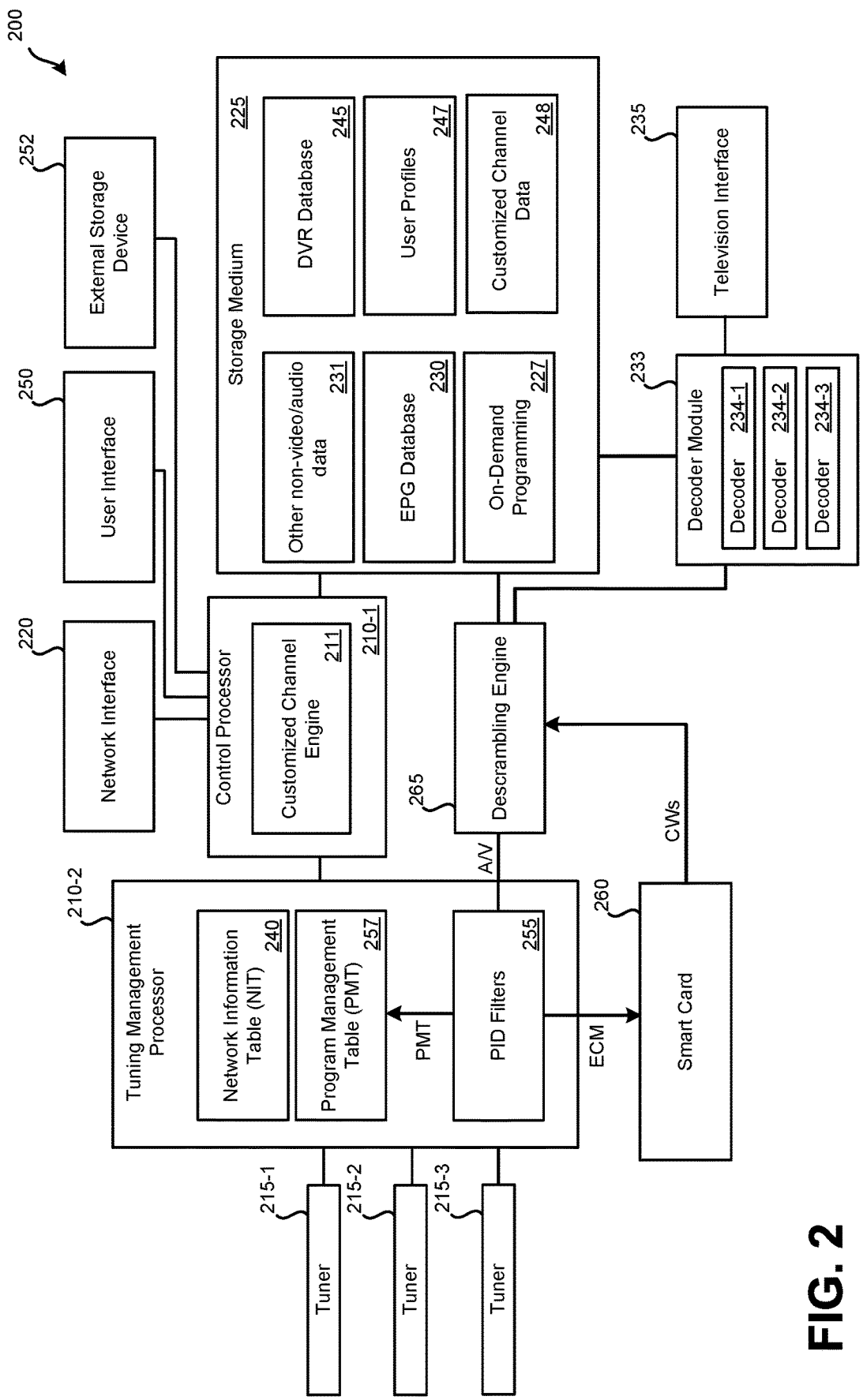
FIG. 2 illustrates an embodiment of a television receiver configured to generate a customized channel.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. While FIG. 1 illustrates an embodiment of television receiver 150 as separate from display device 160, it should be understood that, in other embodiments, similar functions may be performed by a television receiver integrated with display device 160.

The system 100 may include the capability to receive programming from the service provider 110 via the satellite dish 140 or via a Network 190. Programming content may be accessed from additional sources and may include internet programming 195 that may be accessible via the network 190 and/or the satellite dish 140. The STB may include a Customized Channel Engine 211 that may be used to schedule and assemble programming for a customized channel tailored to a user. Customized channel definitions may also be generated by the service provider. A service provider may generate channel definitions (e.g. metadata definitions of programming) that may be used by a receiver to assemble a customized channel. In some instances the service provider 110 may include a Customized Channel Monitor 196. The monitor 196 may monitor schedules of customized channels from different users to determine programming trends, geographic trends, or other data related to popularity of programming, viewer habits, and/or the like. The receiver may communicate information regarding the details of customized channels to the provider through a return channel (e.g., via internet).

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

In FIG. 1 uplink signal 170-1 represents a signal between satellite transmitter equipment 120-1 and satellite 130-1. Uplink signal 170-2 represents a signal between satellite transmitter equipment 120-2 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

In FIG. 1 transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

In FIG. 1 network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 2 illustrates an embodiment of television receiver 200. Television receiver 200 may be configured generate and monitor a customized channel. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1 and possibly additional processors, tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user profiles 247, user interface 250, external storage device 252, smartcard 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include a customized channel engine 211. The customized channel engine may interface with the EPG database 230, tuning management processor 210-2, DVR database 245, and the user profiles 247 to identify user preferences and programming content based on the user preferences. The customized channel engine may determine scheduling of programming content for the customized channel. A programming schedule may be stored and maintained in the customized channel data 248 of the storage medium 225.

Tuners 215 may include one or more tuners used to tune to transponders that include broadcasts of one or more programming streams or television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed. Network interface may be used to access programming content from the internet. Videos, audio, and other content may be accessed and received through the network interface and stored presented for viewing. Although this document illustrates the combination of satellite and internet networks, this is an example and other transmission systems can be combined, such as cable and internet. When combining content from different sources, the receiver may retrieve programming information from all these sources to build the EPG data for the customized channel.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, user profiles 247, programming preview database 248, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive.

Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously. EPG data may be assembled for the customized channel allowing the user to view scheduled programming. EPG data for the customized channel may be assembled from the EPG data of the scheduled programming. Information about videos and other content may also be queried from the internet using search engines and assembled on the EPG.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

User profiles 247 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider defined timers). In some embodiments, data for a user's profile may be defined based on measured viewing habits, such as which television channels and/or categories of television programming does the user watch. User profiles 247 may specify which television programs were recorded based on timers set by the user associated with a specific user profile. User profiles 247 may include profiles for multiple users or may include a single profile for the television receiver in general. In some embodiments, a user is permitted to select which user profile of user profiles 247 is active. User profiles may include preferences for customized channels programming. The user profiles may further include user feedback received from the user regarding programming on the customized channel. The feedback data may be used to refine the programming and schedule of the customized channel.

Decoder module 233 may serve to convert encoded video and audio into a format suitable for output to a display device. For instance, Decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time. Therefore, if nine preview clips are being presented as tiles in a CVM simultaneously, only one or two decoders of decoders 234 may be necessary to decode the encoded preview clips.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200. The DVR functionality may be used to buffer or record programming content from television channels or other sources. Programming may be temporarily recorded and data stored in the DVR database 245.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of smartcard 260 to decrypt ECMs. Decryption of an ECM may only be possible if the user has authorization to access the particular television channel associated with the ECM. When an ECM is determined to correspond to a television channel being stored and/or displayed, the ECM may be provided to smartcard 260 for decryption.

When smartcard 260 receives an encrypted ECM, smartcard 260 may decrypt the ECM to obtain some number of control words. In some embodiments, from each ECM received by smartcard 260, two control words are obtained. In some embodiments, when smartcard 260 receives an ECM, it compares the ECM to the previously received ECM. If the two ECMs match, the second ECM is not decrypted because the same control words would be obtained. In other embodiments, each ECM received by smartcard 260 is decrypted; however, if a second ECM matches a first ECM, the outputted control words will match; thus, effectively, the second ECM does not affect the control words output by smartcard 260. Smartcard 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smartcard 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by smartcard 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smartcard 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 800 of FIG. 8.

Figure 3:
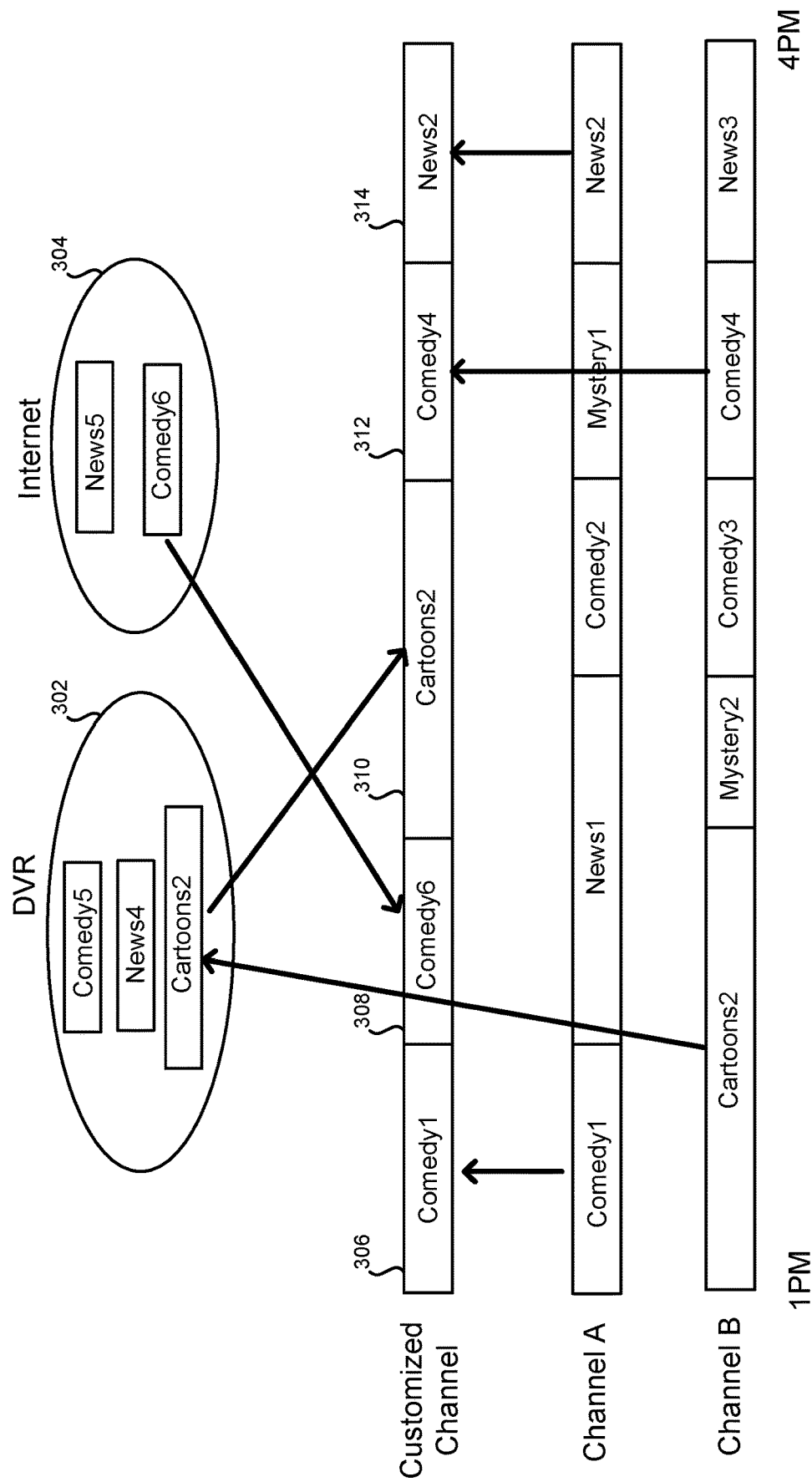
FIG. 3 illustrates an embodiment of a scheduling scenario for a customized channel.

FIG. 3 illustrates an embodiment of a scheduling scenario for a customized channel. A customized channel may include programming content from one or more different sources which may include recorded DVR content 302, content from the internet 304, and/or content from one or more television channels (Channel A, Channel B). A customized channel may have multiple time slots 306, 308, 310, 312, 314 that may be filled with programming content tailored to a user's interest, preferences, and/or viewing habits. Available programming content may include various formats, genres, types, and origins of programming. The available programming content may be parsed, the data or metadata describing the programming may be compared or searched for specific words, descriptions and/or identifiers to determine if the programming matches interests or preferences of the user. For example, if the user has a preference for comedy, the customized channel may be created for programming related to comedy.

In another example, the user's programming viewing habits may be used to determine the user's programming preferences. In some embodiments, programming that a user watches/records in its entirety may be automatically considered preferred programming. Based on the characteristics of watched programming (genre, actors, director, country of origin, etc.), the STB may assign points to each characteristic depending on how many of each type of programming the user watched. For example, if a user watched four comedies in the last week, the genre category may be assigned four points. If the user watched three movies by a specific director (director A) than the director may be assigned three points. The points may be used to determine preferred programming for the user. For each potential programming that may be scheduled for the customized channel, the point totals for each programming may be totaled according to all the characteristics. Programming that is a comedy may be assigned four points. A comedy with director A may assigned 7 points. The programming may be ranked according to the point totals and the programming with the highest scores scheduled for the customized channel. Prime time slots may be assigned to programming with the highest score. In some situations a customized channel can indicate that programming in a specific time period (e.g. between 6 PM and 9 PM) be automatically recorded for the user.

Programming may be ranked or scored according to popularity with other users or preference of other users. In some embodiments the time slots of the customized channel may include constraints or rankings. For some time slots, for example, the user may specify that only a specific programming be shown. Some time slots may be viewed more often by the user and may be ranked higher than less viewed time slots. For example the first time slot 306 at 1 PM may be ranked lower than the last time slot 314 since the user may typically be at work and unable to view the programming scheduled for the first time slot. Ranking of time slots may be useful for determining which programming should be scheduled for which time slot. In some embodiments, the highest ranked programming may be preferably scheduled for the highest ranked time slots.

Identified programming may be scheduled for viewing for the customized channel. In some cases programming that is available from another channel may be viewable via the customized channel during the same time slot as originally aired. For example, Comedy 1, may be scheduled for the same time slot 306 on the customized channel as it would appear on the original channel, Channel A. During time slot 306, the STB may receive the programming from Channel A and make the Comedy 1 programming viewable via the customized channel.

In some cases programming from on-demand sources such as the DVR 302, or internet sources 304 may be played or retrieved on-demand and scheduled. For example, during the second time slot 308, the programming content may be received from the internet 304 displayed to the user.

Figure 4:
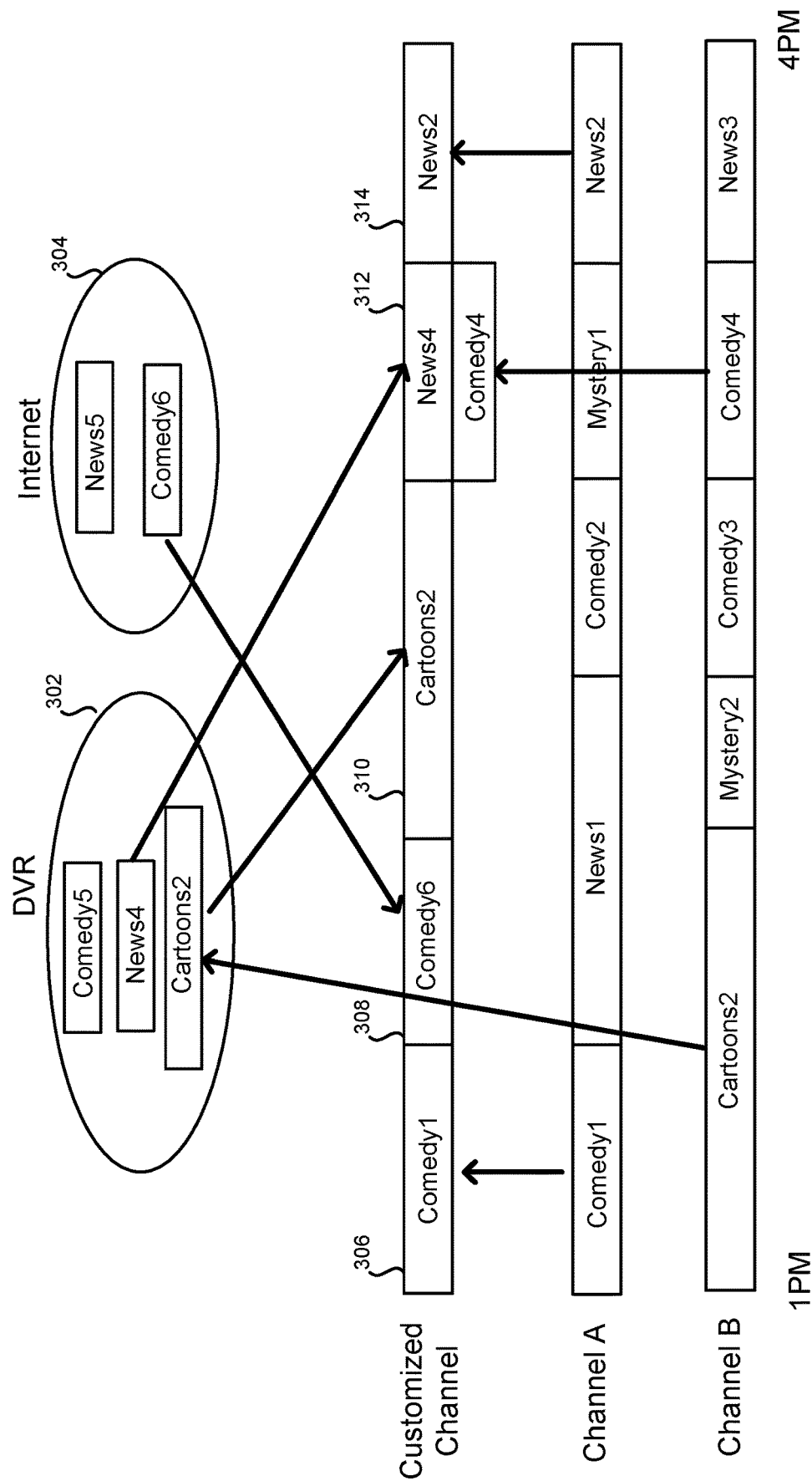
FIG. 4 illustrates an embodiment of a scheduling scenario for a customized channel.

In some cases, programming for the customized channel may be scheduled for a different time slot than originally aired. For example, programming scheduled for the 310 time slot may originally air at a different time. In order to make the programming available for viewing for time slot 310 (Cartoons 2), the programming may need to be recorded during its original air time such that it can be played back during the scheduled time slot. In the example of FIG. 4, Cartoons 2 programming may be recorded to the DVR 302 during its original on-air time on Channel B. During time slot 310 of the customized channel, the Cartoons 2 programming may be played back from the DVR 302 for viewing. After Cartoons 2 programming is viewed the programming may be deleted from the DVR 302.

In the example schedule of the customized channel in FIG. 3, a user may access programming related to comedy from one customized channel without having to change channels, or navigate or search for content.

The content scheduled for the customized channel may be adaptable and take into account a user's changing interest or viewing habits during a day, week, or the year. A customized channel's programming content type may change according to a user's preference. One type of programming content may be scheduled for some time slots while different types of programming content are scheduled for other time slots. For example, the programming scheduled for the customized channel in FIG. 3 may change from cartoons and comedy in time slots 306, 308, 310, 312 to programming content related to news in time slot 314.

In embodiments, the timing or programming type changes, the preferences of the user may be refined with user feedback. User feedback may be provided by the user for each time slot. The user may provide ratings of the scheduled programming, thumbs up or down, or other indication.

In some embodiments, the timing or programming type changes may be refined by presenting the user with two or more options for programming on the same time slot. In some embodiments, two or more programming content options may be scheduled for one time slot as depicted in FIG. 4. For time slot 312 two programming contents are scheduled. The programming content may be selected to determine a user preference or viewing habit based on the choice the user makes between the content. For example, in FIG. 4 one of the programming content is news related (News 4) and the other is a comedy (Comedy 4). During the start of the time slot 312, the user may be prompted to choose between the two programming options. Based on the selection, user preferences and the schedule of the customized channel may be refined. In the example shown in FIG. 4, a user selection of the News 4 programming may indicate that the user may prefer to view news related programming during these time slots and the transition from comedy programming to news programming may be scheduled for time slot 312.

In some embodiments, a user can view the custom channel's schedule in the EPG. If the user wishes to view a program that is scheduled for a future time, and the program is DVRed or may be streamed from an available source, the user will be offered the option to view the program immediately.

Figure 5A:
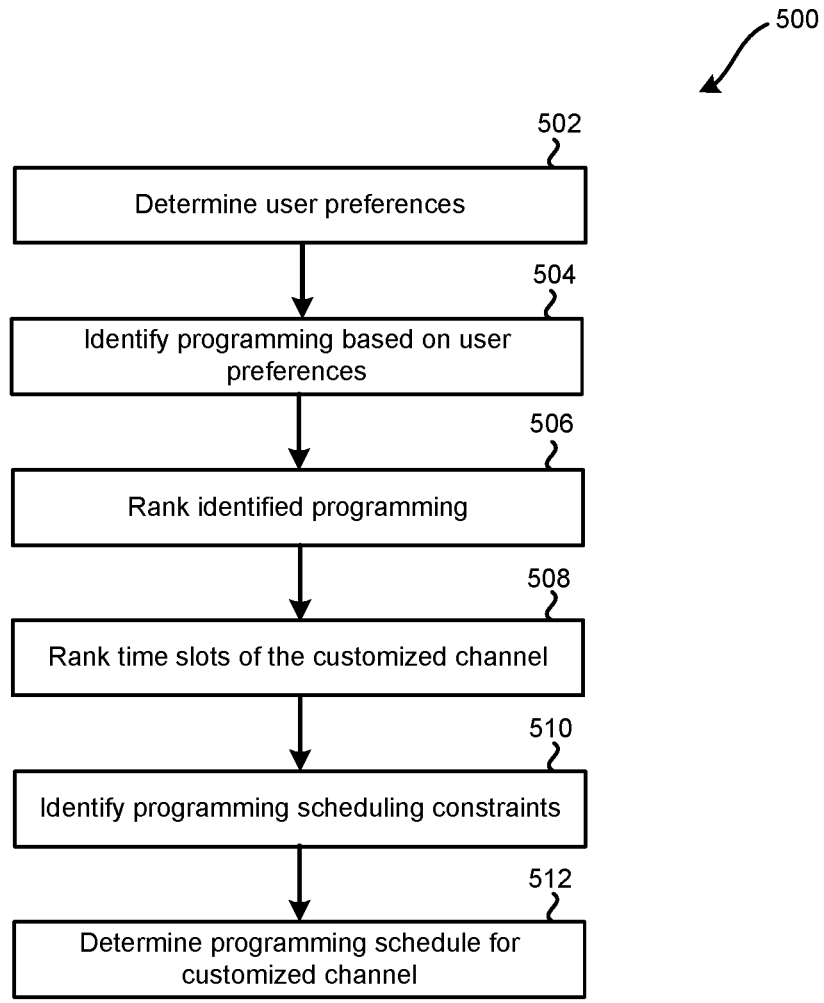
FIGS. 5A and 5B illustrate embodiments of methods for generating a schedule for a customized channel.

FIG. 5A illustrates an embodiment of a method 500 for generating a schedule for a customized channel. Method 500 may be performed using the systems previously described. For instance, satellite television distribution system 100, television receiver 200, and/or customized channel engine 211 of FIGS. 1-2, respectively, may be used to perform method 500. Components of such systems may be implemented using hardware, software, and/or firmware. Further, the performance of method 500 may include one or more instances of the components of computer system 800 of FIG. 8.

At step 502 user preferences may be determined. Preferences may be specified directly by the user. The user may define the genre, programming types, specific shows, actors, sources of programming, exclusions to programming, and/or the like. User preferences may be determined from the user profile and/or other sources.

At step 504, programming may be identified based on the determined user preferences. When available, programming may be identified from multiple sources including broadcast stations, satellite stations, recorded programing, on-demand programming, content from the internet, and/or the like. Programs may be identified from EPG data, metadata, data from websites, and/or other sources. At step 506, the identified programming may be ranked according to the relevance to the user's preferences. The programming may be ranked or scored according the user preferences. At step 508, time slots of the customized channel may be ranked or scored. The time slots may be ranked according to frequency which the user watches programming during the time slot.

In step 510, scheduling constraints may be identified. Constraints may be related to equipment constraints, for example. Limited storage capability of the DVR of the STB may limit how much of the programming may be buffered or scheduled for different time slots than originally aired. In step 512, the programming schedule for the customized channel may be determined based on the rankings of the identified programming, ranking of the time slots, and the scheduling constraints.

Figure 5B:
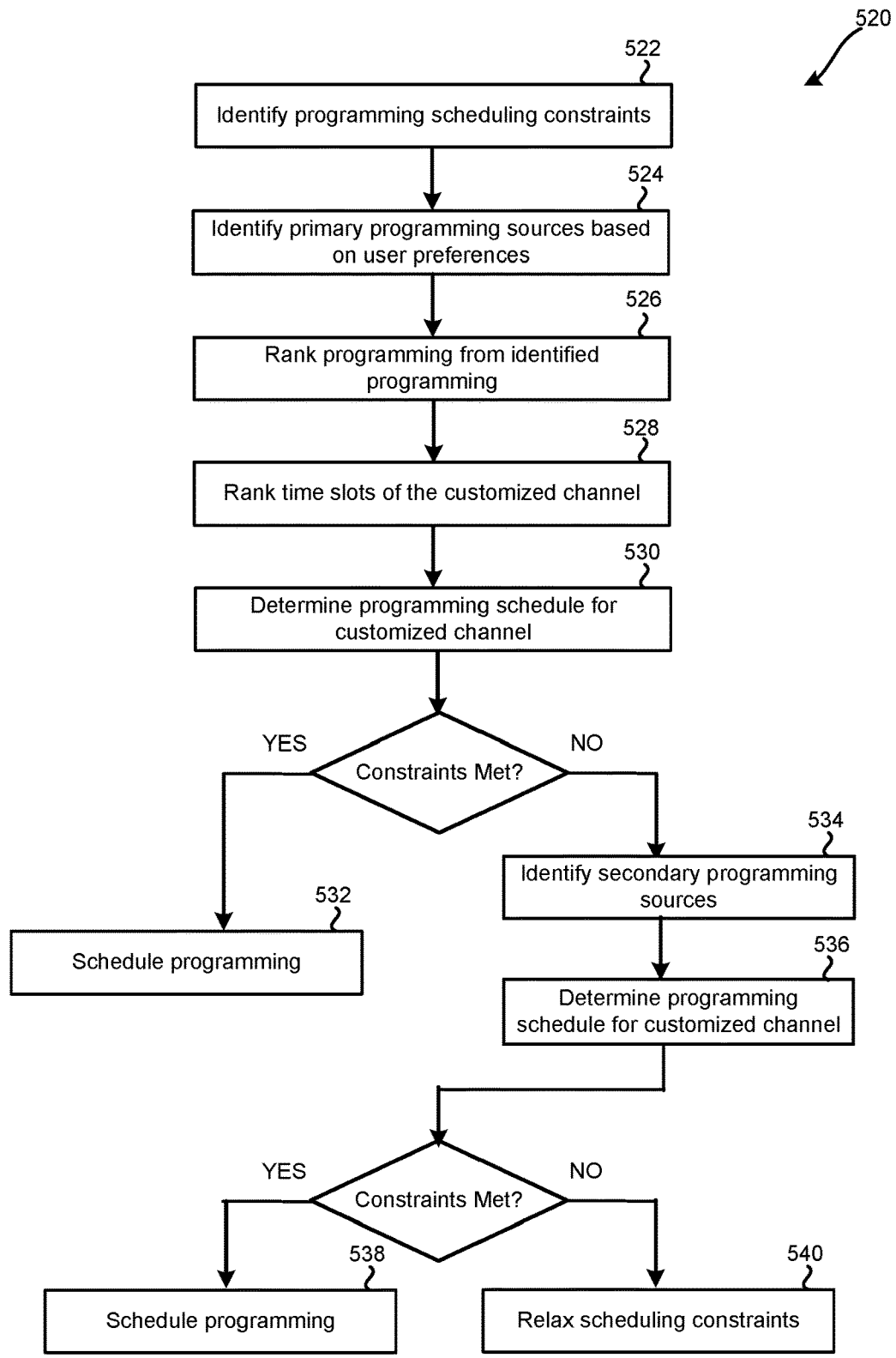

FIG. 5B illustrates another embodiment of a method 520 for generating a schedule for a customized channel. Method 520 may be performed using the systems previously described. At step 522 programming scheduling constraints may be identified. The constraints may be specified directly by the user or determined based on the capabilities of the STB, user habits, and the like. Constraints such as available memory for prerecording may be evaluated. In step 524 primary programming sources may be identified based on user preferences. The user preferences may limit preferred sources of programming to high-definition channels, DVR content, or premium channels. At step 526, the programming from identified sources may be ranked according to the relevance to the user's preferences. At step 528, time slots of the customized channel may be ranked or scored. The time slots may be ranked according to frequency which the user watches programming during the time slot. In step 530 a programming schedule may be determined. The schedule may be determined to meet the constraints and based on the ranking of the programming and time slots. In some cases the available programming may be sufficient to meet the constraints and the determined programming scheduled in step 532 for the customized channel.

In some cases the identified sources may be insufficient for arranging a schedule that meets the constraints. In such cases secondary programming sources may be identified in step 534. The secondary programming sources may be automatically identified based on their similarity to the primary sources. In some embodiments the user may specify a list of primary and secondary sources. In step 536 the programming schedule for the customized channel may again be determined based on programming from the primary and secondary sources. If the new schedule meets the constraints the programming may be scheduled for the customized channel in step 538. If the schedule still does not meet the constraints the constraints may be relaxed in step 540 and the method restarted from step 522. The constraints may be automatically relaxes by the system or the user may be prompted to manually change the constraint setting.

Figure 6:
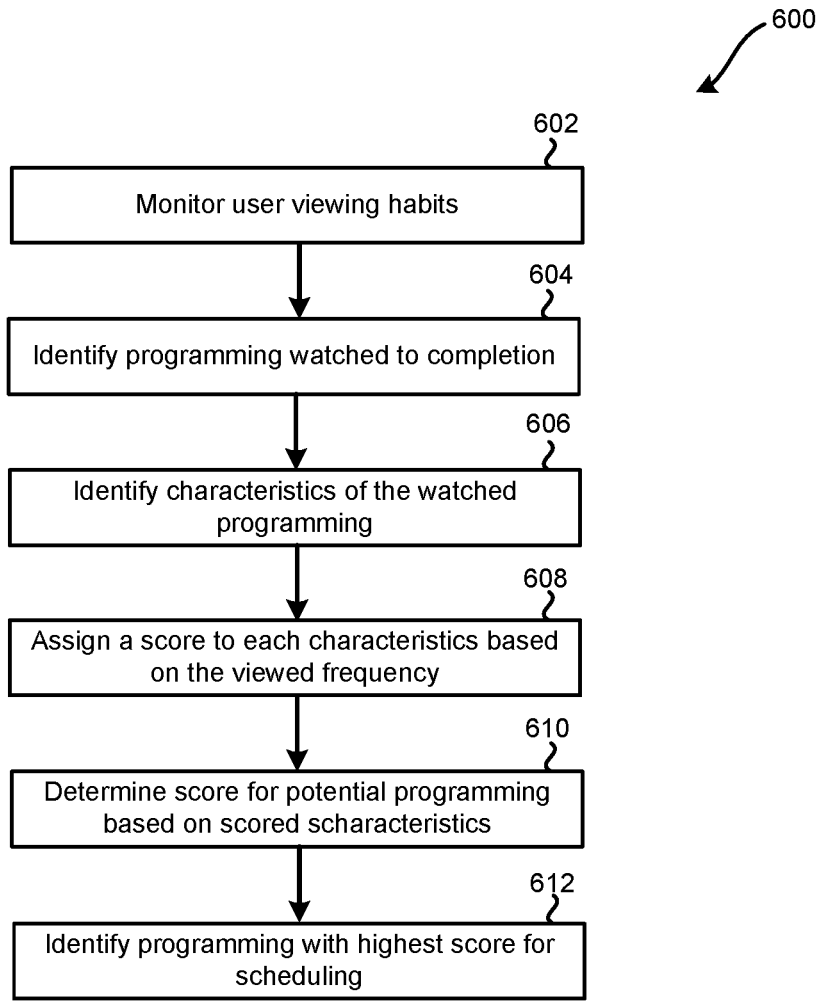
FIG. 6 illustrates an embodiment of a method for identifying programming for a customized channel based on viewing habits of the user.

FIG. 6 illustrates an embodiment of a method for identifying programming for a customized channel based on viewing habits of the user. Method 600 may be performed using the systems previously described. For instance, satellite television distribution system 100 of FIG. 1 may be used to perform method 600. Components of such systems may be implemented using hardware, software, and/or firmware. Further, the performance of method 600 may include one or more instances of the components of computer system 800 of FIG. 8.

At step 602, the STB may monitor the viewing habits of the user. In step 604, programming that the user watches to completion may be tracked as potentially programming that the user has an interest in and may be the user's preferred programming. In step 606 the characteristics of the watched programming may be identified. Characteristics such as the genre of the programming, the actors, producers, directors, country or origin, and or the like may be determined. The STB may track how many times per week or per month programming with a specific characteristic have been watched by the user. In step 608 the STB may maintain a table of characteristics and the frequency with which these characteristics were identified in the watched programming.

In step 610, the customized channel engine may use the table of characteristic scores and identify potential programming for the customized channel. For each new potential programming, characteristics of the programming may be identified and the score for each characteristic may be determined from each table. A sum for all of the characteristic scores for each programming may be determined. Programming with a higher score may generally have characteristics similar to those the user watches frequently. In step 612 the programming with the highest scores may be identified for scheduling.

In some embodiments the user may be provided with a human-readable representation of scores, tables, preferences, and/or decision diagrams used to determine preferred programming and scheduling for the customized channel. The user may be allowed to edit or modify the data or generated scores. The user may be able to edit the scores and view the changes to the scheduled programming in real-time. The representation may be editable via the television receiver. In some cases the representation may be editable via a computer capable of communicating to the receiver. In some embodiments the user may specify restrictions and filters as to what data, scores, types of programming, viewing habits, and the like may be tracked or used for scoring.

Figure 7A:
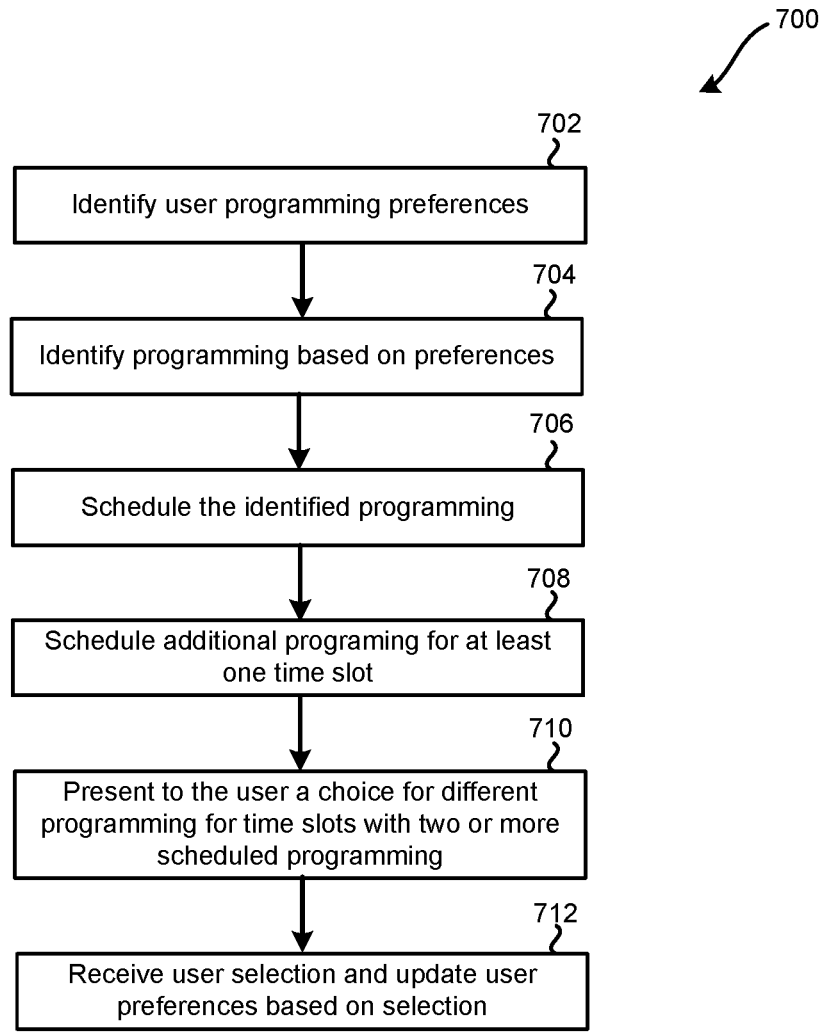
FIG. 7A illustrates an embodiment of a method for determining user preferences by presenting to the user alternative programming.

FIG. 7A illustrates an embodiment of a method 700 for determining user preferences by presenting to the user alternative programming. Method 700 may be performed using the systems previously described. For instance, satellite television distribution system 100, television receiver 200, and/or programming disruption analysis engine 211 of FIGS. 1-2, respectively, may be used to perform method 700. Components of such systems may be implemented using hardware, software, and/or firmware. Further, the performance of method 700 may include one or more instances of the components of computer system 800 of FIG. 8.

At step 702 user preferences for programming may be identified and at step 704 programming based on user preferences may be determined and scheduled for the customized channel in step 706. In step 708, additional programming may be scheduled for some time slots of the customized channel. The additional programming may be scheduled such that at least one time slot has two or more different programming scheduled. The additional programming may be one of the previously identified programming content that matched the user preferences or it may be new or different programming the user has not seen. When the time slot with more than one scheduled programming is active, in step 710, a choice between the programming may be presented to the user. The user may select one of the programming for viewing on the customized channel. In step 712, based on the selection between the different programming, inferences made about the user's preferences may be determined and the user's preferences updated.

Figure 7B:
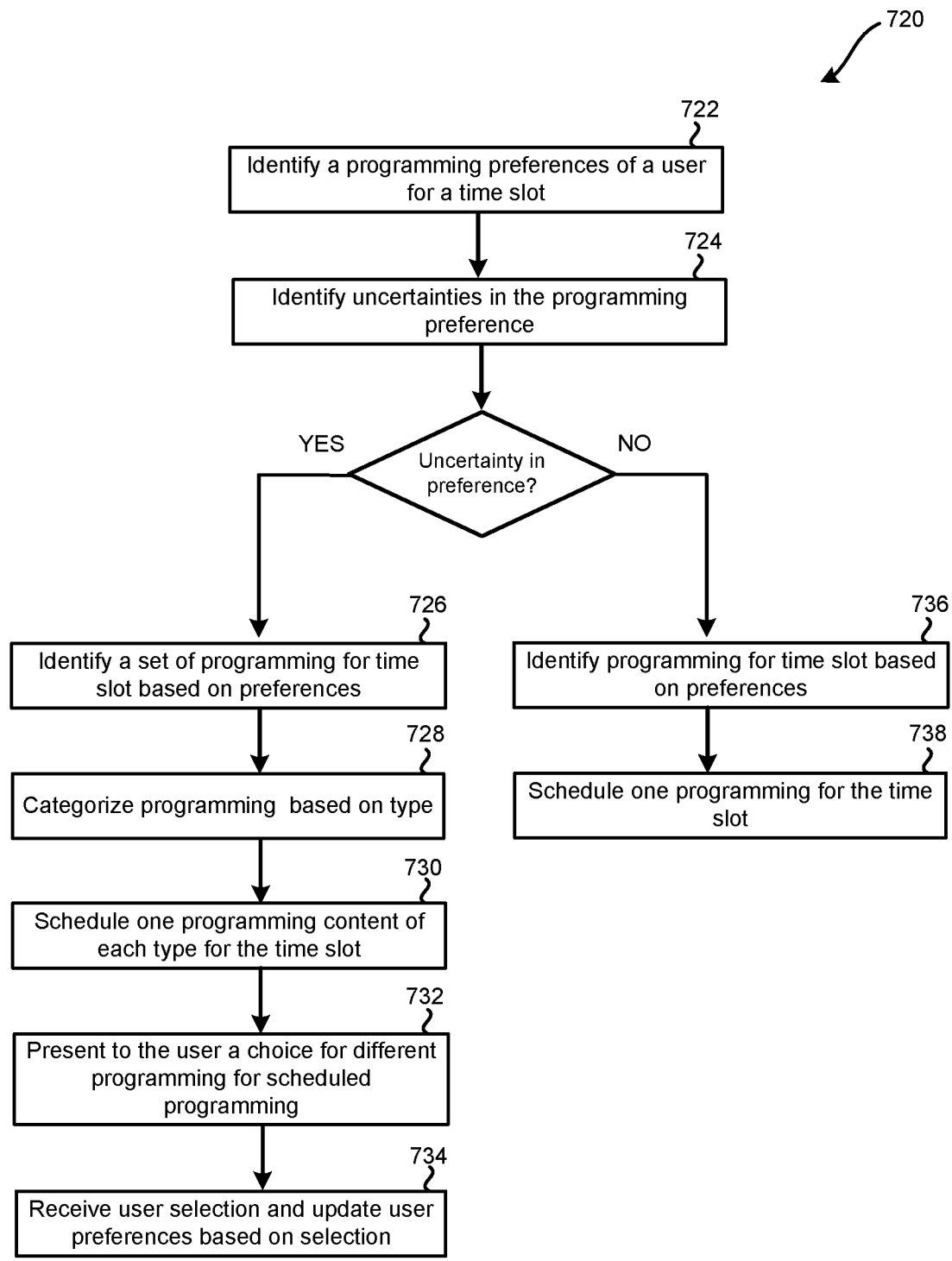
FIG. 7B illustrates an embodiment of a method for resolving uncertainties in programming preferences of a user.

FIG. 7B illustrates an embodiment of a method 720 for resolving uncertainties in programming preferences of a user. Method 720 may be performed using the systems previously described. At step 722 user preferences for programming for a time slot may be identified. At step 724 programming preference uncertainties may be determined. For example, based on the viewing habits of the user it may be unclear what type of programming the user may prefer to watch during the time slot. If no uncertainties are identified, the programming according to the preferences may be identified in step 736 and one of the programming may be scheduled for the time slot in step 738. In some cases uncertainty in programming preferences may be identified.

In some cases more than one type of programming may match the user preferences for the time slot. The programming that matches the user preferences may be identified in step 726 and in step 728 the programming may be categorized based on the type. In step 730 one of each programming content type may be scheduled for the time slot such that there are at least two programs scheduled. When the time slot is active, in step 732, a selection choice between the programming may be presented to the user. The user may select one of the programming for viewing on the customized channel. In step 734, based on the selection between the different programming, inferences made about the user's preferences may be determined and the user's preferences updated.

Figure 8:
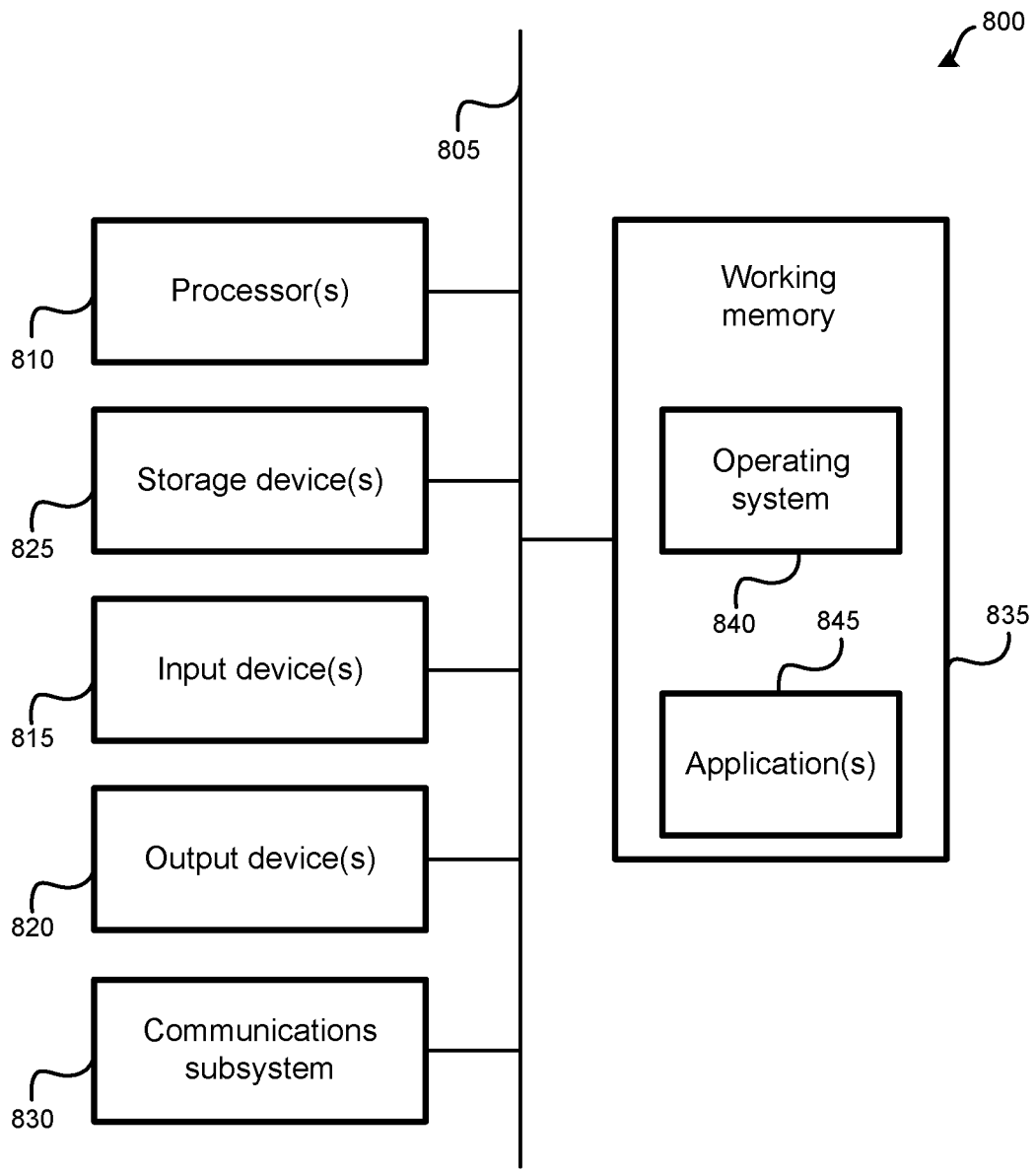
FIG. 8 illustrates an embodiment of a computer system.

A computer system as illustrated in FIG. 8 may be incorporated as part of the previously described computerized devices, such as the described television receivers and television distribution system. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:
   monitoring user selections of a programming content;
   based on the monitoring, determining a set of one or more user preferences, where the set of one or more user preferences comprises a first user preference for a first type of programming that corresponds to a first program;
   identifying a first set of programming content from one or more programming sources based on the set of one or more user preferences including the first user preference for the first type of programming;
   identifying a set of one or more constraints that comprise viewing habits of a user mapped to different times;
   arranging a schedule, for viewing the first set of programming content on a customized channel, based on the viewing habits, the arranging the schedule comprising:
      scheduling the first program of the first set of programming content for viewing on the customized channel at a particular time slot based on the viewing habits for the particular time slot;
      scheduling an alternative program for viewing on the customized channel so that the alternative program is inserted into the customized channel as alternative to the first program at the particular time slot, where the alternative program corresponds to a second type of programming content that different from first type of programming content and is selected to determine a change to the set of one or more user preferences;
   transmitting to a display to facilitate presentation of the customized channel for viewing as a listing in an electronic programming guide so that the listing identifies the first program at the particular time slot and the alternative program at the particular time slot;
   receiving an indication of a user selection of the alternative program at the particular time slot; and
   updating the set of one or more user preferences based on the indication and adjusting the schedule for viewing the second type of programming content on the customized channel.

2. The method of claim 1, wherein the at least one program corresponding to the additional programming content is of a second type of programming that is different from the first type of programming.

3. The method of claim 1, wherein the updating the set of one or more user preferences comprises:
   determining a second user preference for the second type of programming content based on the user selection; and
   adapting the set of one or more user preferences to account for the second user preference.

4. The method of claim 3, further comprising:
   identifying a second set of programming content from the one or more programming sources based on the set of one or more user preferences including the second user preference for the second type of programming content;
   scheduling the second set of programming content for viewing on the customized channel; and
   transmitting to the display to facilitate presentation of the customized channel to identify at least one program from the second set of programming content.

5. The method of claim 4, wherein the one or more programming sources comprises a primary programming source, and the arranging the schedule that based on the constraints comprises:
   determining that at least the primary programming source is insufficient for arranging the schedule that meets the constraints and, consequently, identifying a secondary programming source;
   wherein the arranging the schedule based on the constraints is based on the secondary programming source so that at least part of one or both of the first set of programming content and the alternative program is specified as from the secondary programming source in order to meet the constraints.

6. The method of claim 4, wherein the one or more programming sources comprises one or more primary programming sources, and the arranging the schedule that based on the constraints comprises:
   determining that the one or more primary programming sources are insufficient for arranging the schedule that meets the constraints and, consequently, identifying one or more secondary programming sources; and
   determining that the one or more secondary programming sources are insufficient for arranging the schedule that meets the constraints and, consequently, relaxing the constraints;
   wherein the arranging the schedule is based on the relaxed constraints.

7. The method of claim 6, wherein the arranging the schedule based on the relaxed constraints is based on at least one secondary programming source of the one or more secondary programming sources so that at least part of one or both of the first set of programming content and the alternative program is specified as from the at least one secondary programming source in order to meet the relaxed constraints.

8. A television receiver configured to output a customized channel, the television receiver comprising:
   one or more tuners configured to receive programming content;
   one or more processors; and
   one or more non-transitory, computer-readable media communicatively coupled with and readable by the one or more processors and having stored therein processor-readable instructions which, when executed by the one or more processors, cause the one or more processors to:

monitor user selections of a programming content;
based on the monitoring, determine a set of one or more user preferences, where the set of one or more user preferences comprises a first user preference for a first type of programming that corresponds to a first program;
identify a first set of programming content from one or more programming sources based on the set of one or more user preferences including the first user preference for the first type of programming;
identify a set of one or more constraints that comprise viewing habits of a user mapped to different times;
arrange a schedule, for viewing the first set of programming content on a customized channel, based on the viewing habits, the arranging the schedule comprising:
scheduling the first program of the first set of programming content for viewing on the customized channel at a particular time slot based on the viewing habits for the particular time slot;
scheduling an alternative program for viewing on the customized channel so that the alternative program is inserted into the customized channel as alternative to the first program at the particular time slot, where the alternative program corresponds to a second type of programming content that different from first type of programming content and is selected to determine a change to the set of one or more user preferences;
cause transmitting to a display to facilitate presentation of the customized channel for viewing as a listing in an electronic programming guide so that the listing identifies the first program at the particular time slot and the alternative program at the particular time slot;
receive an indication of a user selection of the alternative program at the particular time slot; and
update the set of one or more user preferences based on the indication and adjust the schedule for viewing the second type of programming content on the customized channel.

9. The television receiver of claim 8, wherein the at least one program corresponding to the additional programming content is of a second type of programming that is different from the first type of programming.

10. The television receiver of claim 8, wherein the updating the set of one or more user preferences comprises:
determining a second user preference for the second type of programming content based on the user selection; and
adapting the set of one or more user preferences to account for the second user preference.

11. The television receiver of claim 10, the one or more processors further to:
identify a second set of programming content from the one or more programming sources based on the set of one or more user preferences including the second user preference for the second type of programming content;
schedule the second set of programming content for viewing on the customized channel; and
cause transmitting to the display to facilitate presentation of the customized channel to identify at least one program from the second set of programming content.

12. The television receiver of claim 11, wherein the one or more programming sources comprises a primary programming source, and the arranging the schedule that based on the constraints comprises:
determining that at least the primary programming source is insufficient for arranging the schedule that meets the constraints and, consequently, identifying a secondary programming source;
wherein the arranging the schedule based on the constraints is based on the secondary programming source so that at least part of one or both of the first set of programming content and the alternative program is specified as from the secondary programming source in order to meet the constraints.

13. The television receiver of claim 11, wherein the one or more programming sources comprises one or more primary programming sources, and the arranging the schedule that based on the constraints comprises:
determining that the one or more primary programming sources are insufficient for arranging the schedule that meets the constraints and, consequently, identifying one or more secondary programming sources; and
determining that the one or more secondary programming sources are insufficient for arranging the schedule that meets the constraints and, consequently, relaxing the constraints;
wherein the arranging the schedule is based on the relaxed constraints.

14. The television receiver of claim 13, wherein the arranging the schedule based on the relaxed constraints is based on at least one secondary programming source of the one or more secondary programming sources so that at least part of one or both of the first set of programming content and the alternative program is specified as from the at least one secondary programming source in order to meet the relaxed constraints.

15. One or more non-transitory, processor-readable media for scheduling programming content comprising processor-readable instructions, which, executed by one or more processors, cause the one or more processors to:
monitor user selections of a programming content;
based on the monitoring, determine a set of one or more user preferences, where the set of one or more user preferences comprises a first user preference for a first type of programming that corresponds to a first program;
identify a first set of programming content from one or more programming sources based on the set of one or more user preferences including the first user preference for the first type of programming;
identify a set of one or more constraints that comprise viewing habits of a user mapped to different times;
arrange a schedule, for viewing the first set of programming content on a customized channel, based on the viewing habits, the arranging the schedule comprising:
scheduling the first program of the first set of programming content for viewing on the customized channel at a particular time slot based on the viewing habits for the particular time slot;
scheduling an alternative program for viewing on the customized channel so that the alternative program is inserted into the customized channel as alternative to the first program at the particular time slot, where the alternative program corresponds to a second type of programming content that different from first type of programming content and is selected to determine a change to the set of one or more user preferences;
cause transmitting to a display to facilitate presentation of the customized channel for viewing as a listing in an electronic programming guide so that the listing identifies the first program at the particular time slot and the alternative program at the particular time slot;

receive an indication of a user selection of the alternative program at the particular time slot; and update the set of one or more user preferences based on the indication and adjust the schedule for viewing the second type of programming content on the customized channel.

16. The one or more non-transitory, processor-readable media of claim 15, wherein the at least one program corresponding to the additional programming content is of a second type of programming that is different from the first type of programming.

17. The one or more non-transitory, processor-readable media of claim 15, wherein the updating the set of one or more user preferences comprises:

determining a second user preference for the second type of programming content based on the user selection; and adapting the set of one or more user preferences to account for the second user preference.

18. The one or more non-transitory, processor-readable media of claim 17, the one or more processors further to:

identify a second set of programming content from the one or more programming sources based on the set of one or more user preferences including the second user preference for the second type of programming content;

schedule the second set of programming content for viewing on the customized channel; and cause transmitting to the display to facilitate presentation of the customized channel to identify at least one program from the second set of programming content.

* * * * *